May 30, 1961   W. E. SCHULTZ   2,986,212
METHOD AND APPARATUS FOR SEALING WATER
FORMATIONS IN A WELL
Filed July 21, 1958
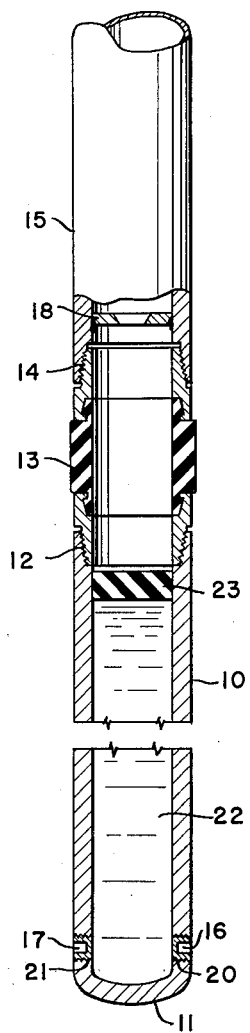
FIG. 1
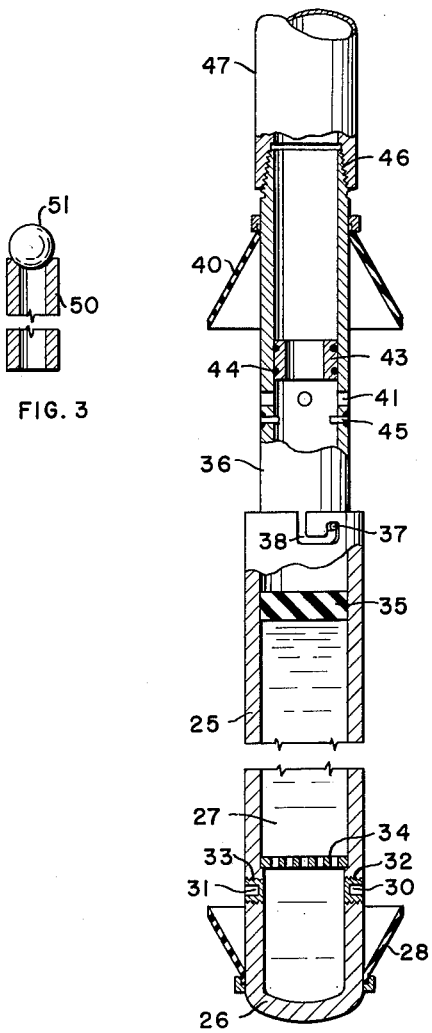
FIG. 3
FIG. 2
INVENTOR:
W. E. SCHULTZ
BY: J. H. McCarthy
HIS AGENT

United States Patent Office 2,986,212
Patented May 30, 1961

2,986,212

METHOD AND APPARATUS FOR SEALING WATER FORMATIONS IN A WELL

Wilburn E. Schultz, Midland, Tex., assignor to Shell Oil Company, a corporation of Delaware Filed July 21, 1958, Ser. No. 749,874

3 Claims. (Cl. 166—21)

This invention relates to the drilling of wells and pertains more particularly to a method and apparatus for sealing water-producing formations encountered while drilling an oil well.

Water-producing formations are often encountered when drilling a well, for example, an oil well. The entry of water into an oil well generally complicates drilling operations regardless of the manner in which the well is being drilled. For example, if the well is being drilled with a water-base drilling mud, additional water entering the well tends to dilute the drilling mud, necessitating the addition thereto of additional quantities of chemicals and other materials which are contained in the mud. If, on the other hand, the well is being drilled while using an oil-base drilling fluid, water entering the well may tend to emulsify with the oil of the mud which results in a change in the characteristics of the mud such as a change in its viscosity, suspending power, plastering properties, etc.

In recent years there has been a considerable increase in the amount of air drilling of wells in which compressed air is employed as the circulating drilling fluid in a well. While using air, the cuttings at the bottom of the borehole are blown to the surface rather than being pumped to the surface in a liquid drilling fluid. The use of air in drilling operation is considerably limited due to the fact that an air stream cannot efficiently remove from the well water which enters the well from a water-producing formation. Foaming agents have been incorporated in the air stream during drilling operations and have met with some success in economically removing small quantities of water from a borehole. However, in the event that appreciable amounts of water are being produced from a formation traversed by a borehole, it has been found necessary to seal off this formation prior to continuing drilling operations with air being used as the drilling fluid.

Sealing off of a water-producing formation may be done in any one of several ways. For example, a string of casing known as a water string may be suspended from the surface to a point below the water-producing formation with cement being pumped in the annulus between casing and the borehole wall to seal off the formation. This method has the inherent drawback of reducing the diameter of the hole so that subsequent drilling operations must be carried out with a drill bit of smaller diameter.

When cement can be pumped under pressure into a cavernous formation or one having many cracks and fissures, it is normally impossible to pump a cement slurry into either a water- or oil-producing formation of normal porosity. Thus, if a load of cement was pumped into the bottom of a well so that it was adjacent a water-producing formation, on the resumption of drilling operations the entire column of cement would be drilled out if a bit of the same size was used. While a sheath of cement might be placed in the wall of a well by first undercutting, or reaming out to a larger diameter, that portion of the well to be sheathed, this entails the time and expense of an additional operation.

Thus, in order to seal off formations producing substantial amounts of water in wells being drilled while using air, gas, mixtures of air and liquids, or low density liquids as the drilling fluid, it has been found to be most practical to seal the formation by injecting into said water-bearing formation a liquid sealing material which is able to enter the formation and solidify therein either on contact with the water or after a determinable time. These formation sealing materials have heretofore been employed by pumping them down a pipe string and injecting them into the formation. While this method has been generally successful with some sealing materials, it is difficult to place small volumes of sealing materials accurately through long lengths of pipe and difficult to avoid contamination of the sealing material with other fluids in the pipe. In order to seal off effectively a water-bearing formation, some plastic sealing liquids must reach the formation in a substantially pure and uncontaminated condition. It has been found that certain of these sealing materials become contaminated while pumping them through a pipe string, which may be as much as a mile or more in length. Additionally, exposure to high temperatures or contamination of some of the sealing materials tends to speed up the setting action of certain of these materials so that much of the material is lost in the form of a coating that is formed on the inside of the pipe string through which the material is pumped to the bottom of a well. At worst, the pipe string could be entirely plugged by the material setting up prematurely in the pipe before it has reached the bottom thereof.

It is therefore a primary object of the present invention to provide a method and apparatus for placing a predetermined volume of a sealing fluid adjacent a water-producing formation in a well borehole and then subsequently injecting said sealing fluid into the formation to prevent any water from entering the well.

In sealing a water-producing formation traversed by a well, it is desirable to use an optimum amount of sealing material. Since some of the better sealing materials cost in the range from 5 to 10 dollars per gallon, it may be seen that use of excessive amounts of a sealing material of this type could be very costly. On the other hand, if too small a volume of sealing fluid is employed, an effective seal may not be formed. Knowing the depth of the water-producing formation to be sealed, it is desirable that a predetermined amount of sealing material be injected into the formation a calculated distance in order to form an effective seal. If the sealing material were to be pumped down a pipe string to a substantial depth in the well, no accurate calculation could be made on the amount of sealing material to be lost in forming a coating on the inside of the pipe string due to the fact that the temperature within the well increases with depth, thus possibly accelerating the setting of the sealing material on the pipe wall and forming a thicker coating with increasing depth.

It is therefore a further object of the present invention to provide a method and apparatus for positioning within a well at a selected level and injecting into a formation at that point, an accurately measured volume of an uncontaminated sealing fluid adapted to penetrate the formation and block the entrance of water into the well.

If a time-setting plastic sealing material is employed which must be held in place in the formation under pressure until it has set, it is generally necessary to leave the pipe string in place in the well until the material in the formation has set. This is expensive and time consuming in that valuable time is lost which otherwise could be utilized in withdrawing the pipe string and making up and lowering the drill string for resuming drilling operations.

Another object of the present invention is to provide an apparatus for lowering sealing material into a well, said apparatus being adapted to be readily disconnected from the lower end of a pipe string and being made of a material that may be easily drilled on resumption of drilling operations.

These and other objects of this invention will be understood from the following description taken with reference to the drawing, wherein:

Figure 1 is a diagrammatic view, taken in longitudinal cross-section, of the apparatus of the present invention adapted to be used when the water-bearing formation to be sealed is located at the bottom of a well.

Figure 2 is a diagrammatic view, taken in longitudinal cross-section, of another arrangement of the apparatus of the present invention to be employed when the water-producing formation to be sealed is at any level above the bottom of the well.

Figure 3 is a diagrammatic view of elements adapted to be dropped down through a pipe string to close the interior of the tool shown in Fig. 2.

Referring to Figure 1 of the drawing, the apparatus of the present invention includes a tubular body member 10 having a closed bottom 11 and being threaded at the upper end, as at 12, so that it may be connected to a packer element 13. The upper end of the packer element 13 is threaded, as at 14, so that it can be connected to the bottom of a pipe string 15. The pipe string 15 is of a length sufficient to reach from the surface of the ground adjacent the well head to a depth within the well so that the tubular body member 10 is positioned adjacent a water-producing formation traversed by the well.

One or more fluid outlet ports 16 and 17 extend through the wall of the tubular body member 10 near the bottom thereof so that a fluid carried in the body member 10 may be discharged therefrom. The ports 16 and 17 are normally closed by a pair of blow-out plugs 20 and 21 which are designed to rupture when a predetermined pressure, say 300–500 p.s.i., is applied to the upper end of the pipe string 15, at the surface, by means of a pump (not shown). The lower end 11 of the tubular body member 10 is preferably rounded to serve as a guide shoe for the apparatus to facilitate lowering the apparatus into a well.

With plugs 20 and 21 in place, a chamber 22 is formed within the tubular body 10 for containing a sealing material to be lowered into the well. After the chamber 22 has been substantially filled with liquid, a resilient plug or pipe wiper 23, preferably one made of rubber, is positioned on top of the fluid. The diameter of the plug 23 is equal to or slightly greater than the inside diameter of the tubular body member 10, thereby providing a slidable fluidtight seal between the sealing fluid within the body member 10 and the space therebove. The height of the plug 23, or the placement of the fluid ports 16 and 17 is such that after the plugs 20 and 21 have been ruptured and all the fluid has been displaced from the tubular body member 10, the plug 23 will effectively close ports 16 and 17 in a fluidtight manner thus preventing the escape of a power fluid being applied above the plug 23.

Since a portion of the present apparatus is to be left in the well after sealing operations have been carried out, such portion is constructed of a readily drillable material such as a plastic or suitable metal such as cast iron, magnesium, or aluminum, or any of their drillable alloys. Some suitable unlatching or disconnecting coupling means are provided whereby the tubular body member 10, and if desired the packer element 13, may be left in the well after the sealing operations have been carried out. In the event that both the tubular body member 10 and the packer 13 are to be left in the well, the threaded joint 14 may be provided with left hand threads so that the elements therebelow can be unscrewed from the pipe string 15 without unscrewing any of the sections of the pipe string itself. If it is desired that only the tubular body member 10 be left in the well, the left hand thread would be formed at 12 instead of at 14.

In order to reduce to a minimum the cost and volume of the sealing fluid used, it is desirable that the tubular body member 10 be of a diameter as large as possible while still being able to run the tool into the well. Thus, a tubular body member having a diameter close to that of the diameter of the well would form between the body member 10 and the wall of the well an annular space as small as possible. It is quite apparent that the sealing material that solidifies in this annular space around the tool would be wasted as it would be subsequently drilled out when a bit of the same size was used in resuming drilling operations in the well. Thus, it is essential that the volume of sealing fluid within the tubular body member 10, and hence the size of the chamber 22 therein, be substantially greater than the volume of the annular space formed outside the tool 10 below the packer element 13 when the tool is in position within a well. Preferably, the volume of the chamber 22 is at least twice that of the annular space outside the tool 10 below the packer 13 so that half of the fluid at least would be injected into the formation to seal it. The length of the tubular body member 10 depends on height of the water-producing formation to seal off, preferably being a few feet longer than the formation. Thus, if there is a 60-foot interval of water-producing formation to be sealed, it is desirable to have the length of the tool below the packer 13 at least 65 feet.

In the arrangement shown in Figure 2 of the drawing, the apparatus comprises a tubular body member or container 25 being closed at the lower end 26 so as to form a chamber 27 therein to contain a volume of sealing fluid. Fixedly secured to the outer surface of the tubular body member 25, near the lower end thereof, is a cup-type packer element 28. Just above the packer 28, the tubular housing member 27 is provided with a pair of fluid discharge ports 30 and 31 that are normally closed by a pair of blow-out plugs 32 and 33. Mounted transversely within the chamber 27, and fixedly secured to the walls of said chamber just above the ports 30 and 31, is a spider or perforate plate 34 that serves as a stop means for the resilient slidable plug 35. It is to be realized that the plug stop means 34 may also be in the form of a grappled plug catcher well known to the art so as to secure the wiper plug 35 to prevent a drainage of sealing fluid back into the chamber 27 after the drill pipe 47 is disengaged from the tool.

In this arrangement the tubular body member 25 is removably secured to the lower end of a second tubular member 36 by means of a pin 37 which mates in a J-slot 38 in a manner well known to the art, to serve as coupling means.

The tubular element 36 is provided with a cup-type or other suitable packer element 40 fixedly secured on the outside of said tubular element 36. At least one or more fluid ports are provided through the wall of the tubular element 36 at a point below the packer element 40. These ports 41 and 42 are normally open but are adapted to be closed by a suitable valve, such for example as a sleeve-type valve mounted for sliding movement within the tubular element 36. The sleeve valve 43 may be provided with one or more O-ring seals 44 which frictionally engage the inner wall of the tubular member 36 so that the valve 43 is normally held in a raised position with ports 41 and 42 open. Stop means 45 are provided on the inner wall of the tubular element 36 just below the ports 41 and 42 for limiting the downward travel of the valve 43. The tubular member 36 is threaded at its upper end, as in 46, for connection to a pipe string 47. A valve of the type shown in 43 is necessary whenever a cup-type packer element 40 is employed. Since the cup-type packer 40 normally engages the wall of the well or the inner wall of the casing as it is lowered into a well, in the event that the well is full of fluid, which is the general case, no fluid could pass upwardly past the packer 40 as the tool is lowered into the well unless an open port 41 or 42 is provided to allow the fluid to by-pass the packer element 40.

According to the present invention it is desired to seal a water-producing formation traversed by a well borehole in a manner such that the water-producing formation will remain sealed upon resumption of drilling operations. To this end a predetermined volume of a sealing fluid is placed in the drillable container 25 which is then closed by plug 35 and attached by means of pin 37 and J-slot 38 to the lower end of the tubular element 36. Multiple sections of pipe are then connected to the top of the tubular element 36 to form a pipe string which extends from the water-producing formation in the earth to the surface of the earth. The length of the tubular elements 25 and 36 between the packer element 28 and 40 is selected so that packers 28 and 40 straddle the water-producing formation to be sealed. At the time the present tool is run into the well, valve 43 is open so that fluid below packer 40 is allowed to by-pass the packer 40, moving up through the pipe string 47.

With the tool shown in Figure 2 positioned opposite a water-producing formation, any suitable weight such as a short length of small-diameter pipe 50 (Figure 3) is dropped through the pipe string 47 until it hits the top of valve 43, forcing it downwardly against stops 45 in which position it closes ports 41 and 42. If the pipe string 47 is not already filled with fluid, water is pumped down pipe string 47 on top of plug 35. Continued pumping of fluid down the pipe string 47 forces plug 35 downwardly exerting sufficient pressure within the chamber 37 to rupture the blow-out plugs 32 and 33 causing the sealing liquid within the chamber 27 to be forced out through ports 30 and 31 into the annular space or chamber formed between the outer wall of the tubular member 25 and the adjacent borehole wall. Pressure is continued until a substantial amount of the sealing material has been forced into the water-producing formation isolated between packers 28 and 40. When the plug 35 reaches the plug catcher or stop means 34, a build-up in pressure at the surface indicates that all of the fluid in the chamber 27 above ports 30 and 31 has been forced out of the container 25 and into the formation.

At this point, a ball 51 may be dropped, if desired, down through the pipe string 47 to seat in the top of the tubular weight 50 thereby preventing discharge of power fluid from the pipe string 47 when the latter is withdrawn to the surface along with the tubular element 36. The pipe string 47 and the tubular element 36 are rotated from the surface a slight amount so that the pin 37 in the J-slot 38 can be rotated and withdrawn upwardly, freeing the pipe string 47 and tubular element 36 so that they can be withdrawn to the surface. It is to be realized that, if desired, the J-slot 38 and pin 37, forming a coupling device between the tool and drill string 47 may also be positioned above the upper packer 40, if it is desired to use a tool of this design. Placement of the J-slot 38 in the latter position would enable the tool with both packers 40 and 28 to be left in the well. This form of the apparatus could be employed when the plastic sealing fluid used takes a somewhat longer time to solidify or form a fixed, water-impermeable mass in the formation. Leaving the tool in the bottom of the well prevents any fluid injected into the formation from draining back, filling the borehole and being wasted as it would be later drilled out upon resumption of drilling operation.

Any suitable sealing material may be employed according to the present invention which may be injected into a formation and form therein a water-impermeable mass.

Among the various materials which may be used are many resins, synthetic resins, plastics, synthetic plastics, such as phenol formaldehyde, polyurethane, epoxy and urea-formaldehyde resins, various gels such as silica gel and acrylamide gels, various gum solutions such as yacca gum in alcohol, mixtures of asphalt and solvents, and the like. The materials used must be water insoluble and must be in a liquid condition in order to inject them into a formation.

After the sealing material has solidified or gelled in the formation, drilling operations may be resumed at which time the drillable tool that was left in the well is drilled out of the borehole along with any solidified sealing material that has hardened between the tool and the wall of the borehole. Alternatively, drilling operations may be resumed in the well with a bit of a size sufficiently small to pass through the inner wall of the container, thus leaving the container as a sleeve surrounded by hardened sealing material.

As stated hereinabove, the arrangement of the tool described with regard to Figure 1 is employed where it is desired to seal a water-producing formation which is at the bottom of the well. By lowering the pipe string 15 with the attached tool to the bottom of the well, and then letting the weight of a portion of the weight of the drill string 15 rest on the tubular body member 10, the packer element 13 expands radially to form a fluidtight seal with the borehole wall above the water-producing formation. It is to be realized that rotation of the pipe in addition to applying compressive weight or a pull in tension may be employed to radially expand the element of certain packers. A pressure fluid such as water is then pumped down through the pipe string 15 to drive the plug 23 downwardly causing blow-out plugs 20 and 21 to rupture and allow the sealing fluid carried in chamber 22 to pass upwardly through ports 16 and 17 and into the adjacent formation to be sealed. When plug 23 is seated at the bottom of the chamber 22, ports 16 and 17 are closed so that the pressure fluid cannot be forced out and mixed with the sealing fluid. At a determinable time after the sealing fluid has been forced from the tubular body member 10 and injected into the adjacent formation, the pipe string 15 is disconnected either above the packer 13 or below the packer by rotation of the pipe string to the right, thus uncoupling it from the tubular body member 10, after which the pipe string 15 is withdrawn to the surface. If desired, the pipe string 15 may be provided with a valve seat 18 on to which a ball 51 may be dropped to close the bottom of the pipe string 15 before it is withdrawn from the well. Under certain conditions it may be found advantageous to coat the container 10 with an insulating material.

I claim as my invention:

1. Apparatus adapted to be lowered into a well for introducing into said well and forcing into a selected formation a predetermined volume of a formation sealing liquid, said apparatus comprising a pipe string adapted to be positioned in a well and extending to the surface, a first cup-type well packer carried on said pipe string near the lower end thereof, a tubular body member open at the upper end and closed at the lower end, coupling means for connecting the upper end of said tubular body member to the lower end of the pipe string adjacent said first packer, said tubular body member having fluid discharge port means near the lower end thereof, blow-out plug means normally closing said port means, a second cup-type packer carried on said tubular body member below the fluid discharge port means therein, said tubular body member adapted to contain a formation sealing liquid, a resilient wiper plug carried within said tubular body member above said sealing fluid, stop means secured to the inner wall of said tubular member to prevent said wiper plug from passing below said fluid discharge port means, fluid passage means through the wall of said pipe string at a point below said first packer and above said wiper plug, said passage means being normally open to circulate well fluid into said pipe string and by said cup packer as the apparatus is run into a well containing fluid, and valve means carried by said tubular body member adjacent said fluid passage means, said valve means adapted to close said passage means.

2. A method of sealing a selected water-producing earth formation traversed by a well borehole, said method comprising the steps of lowering into the well at the end of a pipe string a predetermined volume of sealing fluid in a container, positioning said volume of sealing fluid in said container at a point adjacent the formation to be sealed, closing off the annulus between the container and the wall of the well to provide an annular chamber, the volume of said chamber being substantially less than that of the container, providing a movable partition member above the sealing fluid, pumping a pressure fluid through the pipe string against said partition member to apply a pressure sufficient to force said sealing fluid from said container and into said adjacent formation, discontinuing the application of said pressure fluid, disconnecting said pipe string from said container, removing said pipe string from said well, allowing said sealing material to set, subsequently resuming drilling operations in said well thereby drilling out of the well said container and said sealing material.

3. A method of sealing a selected water-producing earth formation traversed by a well borehole, said method comprising the steps of lowering into the well at the end of a pipe string a predetermined volume of sealing fluid in a container, positioning said volume of sealing fluid in said container at a point adjacent the formation to be sealed, closing off the annulus between said container and the wall of the well to provide an annular chamber, the volume of said chamber being substantially less than that of the container, providing a movable partition member above the sealing fluid, pumping a pressure fluid through the pipe string against said partition member to apply a pressure sufficient to force said sealing fluid from said container and into said adjacent formation, discontinuing the application of said pressure fluid, disconnecting said pipe string from said container, removing said pipe string from said well, allowing said sealing material to set, subsequently resuming drilling operations in said well thereby drilling through said container with a bit of a size sufficiently small to pass the inner wall of said container, thus leaving said container as a sleeve surrounded by set sealing material.

References Cited in the file of this patent

UNITED STATES PATENTS

| | | |
|---|---|---|
| 1,307,027 | Swan | June 17, 1919 |
| 2,014,563 | Halliburton | Sept. 17, 1935 |
| 2,064,336 | Bates | Dec. 15, 1936 |
| 2,163,449 | Owsley et al. | June 20, 1939 |
| 2,236,147 | Lerch et al. | Mar. 25, 1941 |
| 2,357,589 | Holmes | Sept. 5, 1944 |
| 2,399,125 | Lehnhard | Apr. 23, 1946 |
| 2,715,943 | True | Aug. 23, 1955 |
| 2,769,498 | Huber | Nov. 6, 1956 |
| 2,856,004 | Badger | Oct. 14, 1958 |
| 2,858,892 | Carpenter | Nov. 4, 1958 |
| 2,867,278 | Mallory et al. | Jan. 6, 1959 |